United States Patent [19]

Brenner

[11] 4,216,134

[45] Aug. 5, 1980

[54] TRIALLYLCYANURATE OR TRIALLYLISOCYANURATE BASED ADHESIVE SEALANT SYSTEMS

[76] Inventor: Walter Brenner, 974 Columbus Dr., Teaneck, N.J. 07666

[21] Appl. No.: 841,605

[22] Filed: Oct. 12, 1977

Related U.S. Application Data

[63] Continuation-in-part of Ser. No. 641,513, Dec. 17, 1975, abandoned.

[51] Int. Cl.$^2$ .................. C08L 67/06; C08F 8/30; C08G 63/70; B01J 3/16
[52] U.S. Cl. .................. 260/40 R; 156/330; 260/37 EP; 260/37 N; 260/42.43; 260/42.52; 260/42.47; 525/25; 525/44; 525/47; 525/281; 526/261
[58] Field of Search ......... 260/862, 885, 874, 29.15 B, 260/40R 37 N, 37 EP, 42.43, 42.47, 42.52; 526/261; 525/25, 44, 47, 281; 528/73

[56] References Cited

U.S. PATENT DOCUMENTS 4,049,750  9/1977  Brenner .................. 260/864

FOREIGN PATENT DOCUMENTS 2104700  8/1972  Fed. Rep. of Germany.

OTHER PUBLICATIONS

Chem. Abs., vol. 81, 26825v, Takeshi et al., "Sheet Laminated with Diallyl Phthalate & Copper," (1974).
Chem. Abs., vol. 83, 16312e, Fujioka, K., "Rubber Adh. for Polyester Fabrics," (1975).
Derwent Publ. 53600T-AG, DT2104700-Q, "One Component Adhesives," Aug. 10, 1972.
Derwent Publ. 81186U; JA7343389-R, "Anaerobic Hardening Compsns." Dec. 12, 1973.

*Primary Examiner*—Joseph L. Schofer
*Assistant Examiner*—Herbert J. Lilling
*Attorney, Agent, or Firm*—Fidelman, Wolffe & Waldron

[57] ABSTRACT

Single component, shelf stable, anaerobic curing, adhesive compositions displaying high strength and resistance to water, heat and radiation are produced using triallylcyanurate or triallylisocyanurate as a reaction component.

14 Claims, No Drawings

TRIALLYLCYANURATE OR TRIALLYLISOCYANURATE BASED ADHESIVE SEALANT SYSTEMS

This application is a continuation-in-part of Patent Application Ser. No. 641,513 and now abandoned filed Dec. 17, 1975.

BACKGROUND OF THE INVENTION

1. Field of the Invention

This invention relates to liquid adhesive sealant compositions which are shelf stable in the presence of oxygen but which rapidly cure at room temperature with low shrinkage when exposed to anaerobic conditions as on confinement between closely facing, gas impervious surfaces.

2. Description of the Prior Art

One component shelf stable structural adhesive and sealant systems are of considerable commercial interest because they offer greater user convenience than the conventionally employed two component structural adhesives and sealants, especially if they can be cured at ambient temperatures. In the past, a considerable amount of research and development has been carried out to develop such products. Thus, one component epoxy compositions have been developed as adhesives, but they require extended elevated temperature cures to attain useful strength properties. Urethane and silicone based adhesives and sealants have become available which cure at ambient temperatures but their cure mechanism is dependent on the availability of water, usually from the atmosphere, which results in serious limitations in their efficacy for many applications. Also cyanoacrylate types of adhesives have been introduced into the adhesives markets which cure in a matter of seconds at ambient temperatures, again by reaction with moisture, even though they have very definite processing and application limitations particularly as regards types of substrates, durability and chemical resistance and are supplied in a form which can cause severe injury to the skin and eyes.

Perhaps the most successful one-component ambient temperature curing adhesive systems which are now employed, are so-called anaerobic compositions which comprise catalyzed polymerizable mixtures of various monomeric acrylate ester monomers. They are normally liquids remaining in that state as long as they contain an adequate amount of oxygen, such as atmospheric oxygen, and polymerization or cure will not commence even though they may contain substantial amounts of room temperature polymerization initiators. When such anaerobic compositions are however placed between surfaces that are relatively impervious to oxygen, the stabilizing effects of atmospheric oxygen is removed and cure commences within a relatively short time even at ambient temperatures.

The anaerobic adhesive products, now furnished commercially, would find many more applications if certain of their critical performance parameters could be improved. These include enhanced strength properties, particularly toughness, since the cured anaerobics tend to be rather brittle; resistance to a wider range of chemicals; a greater useful service temperature range, which is at present quite limited both as regards to upper and lower service temperatures; and extended range of applicability to different substrates which are now restricted mainly to specific metal surfaces such as brass, steel and aluminum. Also, cure speeds vary with different metals ranging from fast with brass to slow for zinc and for certain finishes on metals such as anodizing, plating and passivating, which will slow or prevent cures. Special primers may have to be used to speed cures. If required, they obviously lessen the all important user convenience factor of an ambient temperature curing one-component adhesive system. An additional vexing problem with the currently produced anaerobic adhesive compositions is that they are most effective only for bonding surfaces with close clearances and lack gap holding characteristics. This is due to a considerable extent to their substantial shrinkage upon cure. Larger clearances furthermore require more material which significantly reduces cure speed and, thus, lowers productivity in assembly bonding operations. Also, cure conditions are quite temperature sensitive, lower temperatures requiring much longer cure times. Cure at 40° F., for example, may require weeks. After many years of research, these problems have not been satisfactorily resolved.

Patents considered to be representative of the state-of-the-art include U.S. Pat. No. 3,249,656, which describes an adhesive based upon an acrylic diester of an ethylene glycol; U.S. Pat. No. 3,046,262 directed to a particular class of unsaturated monomers for use in formulating anaerobic curing compositions; U.S. Pat. No. 3,454,543 which discloses particular amine compounds used as accelerators in anaerobic curing adhesive compositions and U.S. Pat. No. 3,544,536, which describes a group of oxyalkyl amine stabilizers for use in anaerobic sealant formulations.

SUMMARY OF THE INVENTION

Shelf stable, one component, anaerobic curing adhesive and sealant compositions, based upon triallylcyanurate and triallylisocyanurate, display enhanced heat, water and radiation resistance. An inhibitor-promoter-catalyst system included in the composition maintains the adhesive as a liquid in the presence of oxygen, but allows a rapid cure to a solid strong polymer at room temperature when oxygen is excluded. Preferred compositions also include amounts of a prepolymer and one or more diluent monomers.

Hence, it is an object of this invention to provide anaerobic curing adhesive compositions displaying superior physical properties including enhanced resistance to high temperature, water and radiation.

It is another object of this invention to provide room temperature curing adhesive composition containing triallylcyanurate or triallylisocyanurate.

Another object of this invention is to provide a method for sealing fasteners exposed to high temperatures, corrosive chemicals and radiation.

Yet another object of this invention is to provide structures bonded together with this adhesive composition.

DETAILED DESCRIPTION OF THE INVENTION

The adhesive and sealant compositions of this invention comprise broadly a mixture of a basic monomer which may be either triallylcyanurate, triallylisocyanurate or mixtures of the two with inhibitors, promoters and a peroxide-type catalyst. In addition to these necessary components, it is generally preferred to include in the composition one or more diluent monomers and one or more prepolymers. Optionally, there may be added a variety of dyes, pigments, fillers and thixotropic agents.

Compositions thus produced display the following characteristics. They are stable liquids with a shelf life of a year or more when stored at ambient temperatures in the presence of controlled concentrations of oxygen. They will quickly cure at room temperature to form a strong, inert, polymeric solid when placed in an anaerobic environment and will also cure quickly in the presence of oxygen at elevated temperatures. The cured composition displays excellent resistance to heat, water, most solvents and radiation.

The basic monomer is selected from the group of triallylcyanurate (TAC), triallylisocyanurate (TAIC) and mixtures of the two. TAC is a symmetrical, reactive heterocyclic having three vinyl sites and TAIC is its ketone isomer. Both compounds find use as cross-linking agents for elastomers and polymers including polyesters and polyolefins. The cross-linking is usually induced by a free radical mechanism with peroxide initiators at temperatures high enough to decompose the peroxide. So far as is known, neither monomer has previously been polymerized at room temperature using a peroxide catalyst. It is known, however, that beta or gamma irradiation will generate free radicals and induce polymerization of the basic monomers at room temperature.

TAC is a colorless solid at room temperature and melts at about 27° C. to form a low viscosity liquid while TAIC has a somewhat lower melting point. However, incorporation of diluent monomers in the composition lowers the melting point sufficiently to maintain the composition in liquid form within the normal range of use temperatures.

In addition to the basic monomer, the adhesive composition necessarily includes at least one inhibitor and a promoter-catalyst system. Polymerization inhibitors are essential to maintain shelf life of the uncured compositions in the presence of oxygen at ambient temperatures. Many different polymerization inhibitors are known for free radical polymerizations and are applicable here. One widely-used class of polymerizations inhibitors which has been found particularly effective for the novel low shrinkage anaerobic adhesive and sealant compositions which are disclosed in this invention, are the quinones. Typical compounds include hydroquinone, β-naphthoquinone, 2 methoxy-1,4 naphthoquinone, and p-benzoquinone. Concentrations required are generally small, e.g. 50–200 ppm by weight but can be somewhat greater. Hydroquinone is particularly preferred as it does not impart discoloration to the adhesive composition.

Typical catalyst systems for the novel low shrinkage adhesive/sealant compositions disclosed in this invention generally comprise a peroxide-type initiator and a promoter. Preferred initiators are organic hydroperoxides and mixtures of organic hydroperoxides with other peroxides such as dialkyl peroxides. Included within this category are materials such as organic peroxides or organic peresters which decompose to form organic hydroperoxides in situ. Examples of such peroxides are cyclohexyl hydroxycyclohexyl peroxide and t-butyl perbenzoate, respectively. The nature of the organic hydroperoxides is considered not critical to the broad concept of this invention. The general class of hydroperoxides can be represented by the formula R'OOH where R' is a hydrocarbon group containing up to about 18 carbon atoms and preferably is an alkyl, aryl, or aralkyl hydrocarbon group containing from about 3 to about 12 carbon atoms. R' can of course contain any substituent or linkage, hydrocarbon or otherwise, which does not affect the hydroperoxide for the purpose disclosed herein. Typical examples of such organic hydroperoxides are cumene hydroperoxide, t-butyl hydroperoxide, methyl ethyl ketone hydroperoxide and hydroperoxides formed by oxygenation of various hydrocarbons such as methylbutene, octane and cyclohexane and various ketones and ethers.

The organic hydroperoxide initiators can be used within rather wide ranges, i.e., from about 0.05% to as much as about 20% by wt. of these adhesive/sealant compositions. More usually, however, they comprise 12% or less by weight of the adhesive/sealant composition since above that level undesirable effects on the strength and the durability of the adhesive/sealant copolymer compositions may be observed. While in certain situations lower amounts can be used, about 0.1% by weight of the hydroperoxide is frequently used as a lower limit. Preferred concentrations of the hydroperoxide initiator range from 0.1% to about 12% by weight of the adhesive/sealant composition. Dialkyl peroxides of various types may be advantageously added to the hydroperoxide initiator to maximize certain desirable effects such as substrate adhesion, degree and rate of cure, etc. They are generally employed in the same concentration range as the hydroperoxides. Typical dialkyl peroxides are dicumylperoxide; 2,5-dimethyl-2,5-di(t-butylperoxy)hexane; 1,1 bis (t-butylperoxy)-3,3,5-trimethylcyclohexane and di-t-butylperoxide.

Promoters, also known as latent polymerization accelerators, are compounds which do not themselves initiate the desired cure but which accelerate the cure once it has been started by the polymerization initiator. A large number of polymerization accelerators or promoters are known and used in the art of free radical polymerization and the broad concept of this invention is intended to encompass any polymerization accelerator which can be incorporated into these adhesive/sealant compositions without deleteriously affecting the shelf life or performance of such compositions. Tertiary amines can be used to advantage including compounds with alkyl, aryl and aralkyl groups containing up to about eight carbon atoms. These compounds are widely known to those skilled in the art of free radical polymerizations. Primary and secondary amines can also be employed with success including those primary and secondary amines with alkyl groups up to about ten carbon atoms. Heterocyclic secondary amines with hydrogenated heterocyclic rings, such as piperazine and pyrrolidone, are also effective. Polyamines are good promoters with compounds such as 1,2 propane diamine, 1,3 propane diamine, tetraethylene pentamine, ethylene diamine and N-(2 ethanol) ethylene diamine known for their activity which may be further enhanced by the addition of small amounts of organic acids, e.g., formic, acetic, proprionic, hexanoic and 2-ethyl hexanoic acid. Amides having an aliphatic hydrocarbon group with from 1–20 carbon atoms such as formamide, dimethylacetamide, etc., are likewise effective accelerators. Organic sulfimides and alkyl imides are also most useful. The promoters can be used alone or in combinations as required. The proportions of these promoters in the anaerobic compositions can by widely varied depending upon the cure characteristics desired. They generally range between 0.1% and 8% by weight of the adhesive/sealant compositions with 0.5%–5% by weight preferred.

Preferred adhesive-sealant compositions include at least 5% and, most preferably, at least 20% by weight of a reactive diluent monomer. Diluent monomers can reduce the melting point of the basic monomer and generally decrease the cost of the composition without adversely affecting the properties of the cured adhesive. As a matter of fact, in many cases proper selection of diluent monomers will enhance specific physical properties of the cured adhesive. The diluent monomer must be an ethylenically unsaturated, reactive organic liquid monomer which is soluble in the basic monomer and chemically compatible and copolymerizable therewith. Examples of diluent monomers useful in the compositions of this invention include styrene, divinylbenzene, diallylcarbonates, diallylmaleate, diallylphthalate, diallylisophthalate, polyfunctional acrylates and methacrylates selected from the class consisting of the di-, tri- and tetra-esters of an acrylic acid or a methacrylic acid and a polyhydric alcohol and vinyl pyrrolidone.

Preferred compositions also include one or more prepolymers in addition to or in place of the diluent monomer. As used in this application, the term "prepolymer" means a relatively low molecular weight, liquid, semi-solid or solid polymer which is capable of copolymerizing with the basic monomer and with the diluent monomer if present. In addition, the prepolymer must be soluble in the monomer mix to give a liquid composition over the ordinary temperature range of storage and use, i.e., about 40° to 90° F.

A variety of prepolymers meet these criteria. Exemplary prepolymers useful in this invention include high vinyl 1,2-polybutadienes and copolymers thereof especially with styrene; isophthalic polyesters; bisphenol A fumates and other alkyls; epoxy resins; polyalkylvinylethers and related polymers; alkylic resins based on polyfunctional ethers and esters and mixtures of two or more of these prepolymers.

Particularly preferred prepolymers include the relatively low molecular weight polyesters such as the reaction product of phthalic anhydride or isophthalic acid with dihydric alcohols. Examples of suitable; commercially available polyester prepolyers are these sold under the trademarks Atlac, Aropol and Hetron.

Other preferred prepolymers include the low molecular weight polymers of an allyl ester of an aromatic polycarboxylic acid such as diallylphthalate and polyvinylmethyl ether. Suitable diallylphthalate prepolymers are commercially available under the trademark Dapon-35. Appropriate polyvinylmethyl ether prepolymers are sold under the Gantrez trademark of GAF Co.

It is essential that the prepolymer or mixture of prepolymers used be soluble in and chemically compatible with the monomer system. It is also essential that the prepolymers must be copolymerizable with the monomers to produce copolymeric solids. In addition, it is highly desirable that the prepolymer used should have chemical and physical properties such that the resulting copolymeric solids will be formed from initially liquid compositions with minimal shrinkage so as to avoid unduly large dimensional changes of the curing adhesive or sealant in order to avoid pulling away of the parts which are to be bonded or sealed or possibly change the dimensions or configuration of the bonded or sealed joint during cure.

A reduction in shrinkage during cure is of particular value for adhering parts with variable clearances as it assures attainment of uniform bond strength with minimal effect of surface irregularities. It is also advantageous for applications in which the bonded parts undergo repeated thermal cycling which greatly accentuates the dimensional stability requirements of an adhesive.

Shrinkage upon cure of the adhesives of this using appropriate prepolymer additions is typically on the order of 6% to 8% and can be reduced to as low as 4% to 5% with some compositions. In contrast, commercially available anaerobic adhesives based upon trimethylolpropanetriacrylate show a shrinkage of over 15% while other commercial adhesives employing the di, tri, tetra and polyethylene glycol methacrylates show shrinkage upon cure of 14.1%, 14.5%, 14.2% and 14.0% respectively.

The prepolymer may comprise up to about 50% of the adhesive composition by weight but preferred prepolymer levels are in the range of 15% to 35% by weight. As prepolymer content of the adhesive compositions increases, shrinkage upon cure tends to decrease. Conversely, as the proportion of basic monomer decreases and the amount of prepolymer and/or diluent monomer increases, both heat resistance and chemical resistance tend to decrease. Adhesive compositions containing essentially only the basic monomer show temperature stability to about 500° F. However, compositions containing as little as 10% of the basic monomer, TAC, TAIC or mixtures of the two, give remarkable increases in strength compared to conventional anaerobic adhesives, while basic monomer levels of 20% or more provides substantially improved heat resistance as well. Maximum radiation resistance is attained at the very high levels of basic monomer content; 70% or above.

Other materials may be added to the adhesive compositions to impart desirable properties for specific uses. Such materials include thixotropic agents, pigments, dyes and fillers. The added materials may be used in combination and in widely varying amount provided that they do not adversely affect the cure characteristics of the composition or the physical properties of the resulting polymeric bond. While generally used in small amount, these added materials preferably comprise no more than about 30% by weight of the composition. Specific additives are well known in the act of formulating unsaturated polyesters and epoxy resins and such additives are generally appropriate for use in the compositions of this invention.

One of the major uses for the anaerobic adhesive compositions of this invention is for securing metal fasteners. Typical applications include securing screws on electrical and communications equipment, securing nuts which hold moving parts in place, such as on tie rods and bearings and other similar uses. The adhesive may also be employed as a hydraulic sealant for plastic pipes and tubing and in joining close fitting, air impervious surfaces.

It is highly desirable to include thixotropic agents in adhesive compositions designed for securing fasteners as it facilitates application of the adhesive to the fastener. Thixotropic agents are well known and many of the conventional thixotropic agents may be used to advantage in the compositions of this invention. Selected thixotropic agents give superior results when used in the disclosed compositions and these agents are preferred. A preferred thixotropic agent is colloidal silica such as that manufactured by the Cabot Corporation and sold under the trade designation Cab-O-Sil.

Formulation of the disclosed adhesive compositions is accomplished by simple mixing of the components as the components are readily soluble or dispersible. High shear mixing may be required to produce certain heavily filled compositions in order to obtain uniform dispersion of the fillers.

The adhesive compositions must be packaged in such a manner as to insure contact with sufficient oxygen to stabilize the adhesive and prevent polymerization during storage. This may readily be accomplished by partially filling containers leaving an air space at the top. Low density polyethylene is particularly preferred as the packaging material. Packaged in this manner, the adhesive compositions display shelf lives of one year or more when stored at temperatures of 70° F.±20° F.

Some routine experimentation may be necessary in order to formulate adhesive compositions tailored for specific end uses. Physical properties of the cured adhesive can be determined in a routine fashion and shelf life, or stability under storage, can be determined by an accelerated aging test.

The following examples illustrate specific embodiments of the invention and provide guidance to the routineer in preparing other formulations within the scope of this invention.

EXAMPLE I

Technical grade triallylisocyanurate monomer (350 grams) was blended with trimethylolpropanetrimethacrylate monomer (200 grams). The solution was catalyzed with cumenehydroperoxide (0.75 wt %) and an amine type accelerator such as dimethylaniline (0.47 wt %) or blends thereof with alkyl or aryl imides. A polymerization inhibitor, e.g., benzoquinone, was added (0.02 wt %) for storage stability. The resulting composition was then stored in low density opaque polyethylene containers with aliquot portions taken periodically to test shelf life by an accelerated service test. The test comprised heating a tube containing a small portion of the solution at 80° C. in a water bath kept at that temperature and determining the time at which the solution would gel. This time was found to be in excess of 30 minutes equivalent to at least one year's shelf life when stored under the above specified conditions. Another portion of the composition was cast into a mold lined with saturated polyester film and cured at a temperature above 100° C. in a press. The measured shrinkage of the resulting copolymer upon cure as found to be greater than 10%.

Tests were carried out in order to determine the adhesive characteristics of the above specified solution using ¼" diameter 1" long threaded steel screw and nut assemblies with various clearances. Several drops of the composition were placed on the threads of the screws and a nut was screwed onto the screw so that about four threads were left exposed below the nut. With effective exclusion of air, assemblies having clearances of 0.005" or less could not be separated by hand after approximately 1 hour and a torque strength greater than 30 in # was obtained after a 24 hour cure. Bonding of similar assemblies with greater clearances was much less effective. Such assemblies typically could be separated by hand even after 3 hours. The bonding agent retained about 50–60% of its strength properties after exposure to 350° F., measured at 350° F.

EXAMPLE II

A similar adhesive composition was then prepared containing various amounts of polyvinylmethyl ether and the same catalyzed monomer blend as described in Example I. A typical commercially-available grade of this polymer is Gantrez M of GAF Co. Accelerated aging tests at 80° C. showed gelatin times in excess of 30 minutes for a wide range of polyvinylmethyl ether contents indicating acceptable shelf life at ambient temperatures. Castings made, as described above, showed a shrinkage in the order of 5–6% for initially liquid compositions which contained up to 50 wt % of the polymer. Even with clearances of 0.010" and greater, bonded assemblies of threaded steel screws and nuts could not be separated by hand after approximately 3–3½ hours and gave substantial torque strength after a 24-hour cure. Strength retention of the adhesive at 350° F. measured at that temperature was of about the same order as described in the previous paragraph. Also ethyleneglycoldimethacrylate or polyethyleneglycoldimethacrylate monomer could be used in place of the trimethylolpropanetrimethacrylate monomer and gave similar results. When polymethylmethacrylate polymer was substituted for the polyvinylmethyl ether, the adhesive composition gelled in the 80° C. accelerated service test after less than 30 minutes. The shrinkage of a casting upon cure was of the same order as that measured for the polyvinylmethyl ether/monomer syrup.

A comparison of the data in Examples I and II illustrates the reduction in shrinkage upon cure brought about by the inclusion of a prepolymer in the adhesive composition. Example II also illustrates the effect of various prepolymers upon the expected shelf life.

EXAMPLE III

Technical grade triallylcyanurate monomer (100 grams) was blended with ethoxylated bisphenol A dimethacrylate (100 grams) and trimethylolpropanetrimethacrylate (200 grams). The solution was catalyzed with cumenehydroperoxide (10 wt %) and an amine accelerator such as dimethylaniline (0.65 wt %). A polymerization inhibitor, e.g., p-benzoquinone (0.03 wt %), was added for storage stability. A portion of this composition was stored in low density opaque polyethylene bottles and tested periodically using the above described 80° C. accelerated aging test in order to ascertain if it would be shelf stable over an extended period of time. The gel time of this composition at 80° C. was in excess of 30 minutes indicating that it exhibited commercially useful shelf stability at ambient temperatures. A casting of this monomer blend gave copolymers with a shrinkage of more than 10%.

The adhesive and sealant performance of the copolymer compositions were evaluated on various surfaces as described in Example I above. Steel screw and nut assemblies with clearances in the order of about 0.005" could no longer be separated by hand after approximately 1 hour at ambient temperatures. Bonding of similar assemblies with greater clearances was much less effective. Similar compositions were prepared containing various amounts of a commercially available isophthalic polyester alkyd (Hetron 500G, Hooker Chemical Co.) and a diallylphthalate polymer (Dapon 35, FMC Corp.) and the same catalyzed monomer blend as discussed above. Formulations which cured to copolymers with a 5–6% shrinkage could be prepared. They had adequate shelf life stability as indicated by the 80° C. accelerated aging test results and were capable of bonding screw/nut assemblies with a wider clearance range in various metals including steel, aluminum, silicon bronze, brass, stainless and plated steels with exclusion of air at ambient temperatures. Torque strength of 20 inch # and higher were recorded after one day.

EXAMPLE IV

Technical grade triallylcyanurate monomer (100 grams) was blended with diallylphthalate monomer (200 grams) and trimethylolpropanetrimethylacrylate (100 grams). The composition was catalyzed as described in the above examples and proved to be shelf stable as measured by the 80° C. gel test. Copolymer castings had a shrinkage in excess of 10%. This composition was evaluated as an adhesive with screw/nut metal assemblies as described in Example I above. Assemblies of various metal screws and nuts with clearances in the order of 0.002" or less were investigated. The metals included steel, aluminum, silicon bronze, brass, also stainless and plated steel parts. Bonding so that they could no longer be separated by hand was obtained within 3 hours. When additional assemblies with wider clearances were evaluated, bonding performance was found to be much reduced inasmuch as the assemblies could be separated by hand even after 5-6 hours.

Similar compositions were prepared containing various amounts of a diallylphthalate polymer such as Dapon 35 (FMC Corp.). The use of only 15-20 wt % of this polymer resulted in a marked reduction in shrinkage and significantly enhanced the bonding effectiveness of the adhesive copolymer composition with respect to permissible clearance tolerances. Shelf life was not affected. The torque strengths of assemblies with a wide clearance range were measured after 3 days and were found to be 10 inch # or higher.

EXAMPLE V

A polymerizable mixture was prepared which consisted of 30 wt % of a liquid, commercially available, polyester prepolymer sold under the trade designation Hetron 63G, 30 wt % ethylene glycol dimethacrylate and 40 wt % diallylphthalate. To 1000 parts by weight of the polymerizable mixture was added 600 ppm of hydroquinone, 5 parts by weight of benzoin sulfimide, 13 parts by weight of dimethyl-p-toluidine and 20 parts by weight of cumene hydroperoxide. The hydroquinone functioned as an inhibitor, the benzoin sulfimide and dimethyl-p-toluidine functioned as promoters and cumene hydroperoxide acted as a catalyst. This final blend was designated component I.

Component I was blended with varying amounts of triallylcyanurate and triallylisocyanurate and subjected to an accelerated service test as described in Example I. Results of this testing showed the blends to display a useful shelf life when stored under normal conditions.

A series of sample adhesive compositions was prepared by mixing component 1 with triallylcyanurate, triallylisocyanurate and mixtures of the two. These samples were as follows:

TABLE I

| Sample Designation | Component I | Triallylcyanurate | Triallylisocyanurate |
|---|---|---|---|
| A | 90 | 10 | |
| B | 80 | 20 | |
| C | 70 | 30 | |
| D | 90 | | 10 |
| E | 80 | | 20 |
| F | 70 | | 30 |
| G | 90 | 5 | 5 |
| H | 80 | 10 | 10 |
| I | 70 | 15 | 15 |

All amounts are in weight percent.

The adhesive and sealant performance of each of the samples was then evaluated on various surfaces. Several drops of each sample were placed on the threads of each of a number of mild steel, stainless steel, aluminum, brass and zinc or cadmium plated ¼ inch bolts and nuts. The nut and bolt pairs were assembled by screwing the nut onto the bolt until about three threads of the bolt were left exposed below the nut. After being allowed to cure for 24 hours at ambient conditions, each assembly was tested by attempting to turn the nut relative to the bolt. None could be turned by hand. Thereafter, the break away torque and prevailing torque of each assembly was determined using a standard torque wrench. Break away torque is defined as that required to produce the first movement of a nut relative to a bolt and prevailing torque is that required to maintain a constant movement of a nut relative to a bolt over one revolution. Results of these tests are set out in the following table. In all cases, the first figure denotes break away torque and the second figure denotes prevailing torque in inch pounds.

TABLE II

| Sample | Mild Steel | Stainless Steel | Aluminum | Brass | Plated |
|---|---|---|---|---|---|
| A | 52/223 | 37/250 | 78/157 | 46/195 | 70/216 |
| B | 45/191 | 59/184 | 72/157 | 41/166 | 76/216 |
| C | 28/164 | 49/174 | 60/146 | 35/144 | 55/181 |
| D | 42/170 | 32/145 | 72/170 | 32/118 | 53/178 |
| E | 45/145 | 41/180 | 77/172 | 46/194 | 53/152 |
| F | 41/141 | 33/131 | 64/159 | 33/179 | 46/157 |
| G | 41/195 | 37/177 | 69/165 | 36/174 | 47/174 |
| H | 43/157 | 51/193 | 68/157 | 46/194 | 71/203 |
| I | 40/139 | 42/161 | 73/173 | 55/169 | 64/193 |

These data show that all sample compositions tested display excellent strength properties and are useful as locking compositions for a variety of different metal fasteners.

The samples were then further tested to determine their water and heat resistance characteristics. As before, several drops of each sample were placed on the threads of a number of mild steel nuts and bolts. The assembled pairs were then allowed to cure for 24 hours and half of the sample group was tested for water resistance and the other half was tested for heat resistance. The water test consisted of a water immersion of the assemblies for one week while the heat test consisted of holding the assemblies at a temperature of 350° F. (177° C.) for one week. At the end of the test period, break torque and prevailing torque was determined for each assembly. Results were as follows with the first figure representing break torque and the second figure representing prevailing torque.

TABLE III

| Sample | Water Test | Heat Test |
|---|---|---|
| A | 50/215 | 55/242 |
| B | 64/211 | 58/235 |

TABLE III-continued

| Sample | Water Test | Heat Test |
|---|---|---|
| C | 59/241 | 44/215 |
| D | 50/212 | 55/233 |
| E | 55/232 | 64/210 |
| F | 50/215 | 65/245 |
| G | 64/210 | 52/215 |
| H | 51/240 | 58/230 |
| I | 61/227 | 61/234 |

As may be seen by a comparison with the data in Table II, both immersion in water and exposure to a relatively high temperature tended to significantly increase the bond strength. These tests demonstrate the suitability of the adhesives for use as locking compositions for metal fasteners exposed to moisture and elevated temperatures.

EXAMPLE VI

A mixture of Hetron 63G polyester prepolymer and a 50/50 blend of triallylcyanurate and trimethylolpropanetrimethylacrylate in a 30/70 ratio by weight was prepared. To this mixture was added the inhibitor, promoters and catalyst, as described in Example V. This composition was designated Sample J.

In a similar fashion, a mixture of diallylphthalate, sold under the trade designation of Dapon 35, and a 50/50 blend of triallylcyanurate and trimethylolpropanetrimethylacrylate in a 30/70 ratio by weight was prepared and was designated Sample K.

The adhesive and sealant performance of these two samples was then evaluated in the manner described in Example V. Results were as follows:

TABLE IV

| Sample | Mild Steel | Stainless Steel | Aluminum | Brass | Plated |
|---|---|---|---|---|---|
| J | 104/216 | 182/232 | 90/250 | 83/246 | 84/216 |
| K | 96/212 | 102/216 | 86/245 | 92/234 | 76/220 |

Thereafter the samples were tested to determine their water and heat resistance characteristics on mild steel nuts and bolts in the manner previously described. Results of these tests are set out in the following table.

TABLE V

| Sample | Water Test | Heat Test |
|---|---|---|
| J | 123/226 | 108/241 |
| K | 107/218 | 104/209 |

Again, these data show the sample compositions to display excellent strength properties as locking materials for metal fasteners and to show an actual increase in bond strength upon exposure to water or to elevated temperatures.

EXAMPLE VII

A mixture of Hetron polyester prepolymer and a 50/50 blend of triallylcyanurate and trimethylolpropanetrimethacrylate in a wt ratio of 30/70 was prepared. To this mixture was added the inhibitor, promoters and catalyst described in Example V. A second composition was prepared in which Dapon 35 prepolymer was substituted for the polyester. Both compositions were shelf stable as determined by accelerated aging tests.

The adhesive and sealant performance of each composition was evaluated in the manner described in Example V with the following results:

TABLE VI

| Sample | Mild Steel | Stainless Steel | Aluminum | Brass | Plated |
|---|---|---|---|---|---|
| TAC + polyester | 104/216 | 182/232 | 90/250 | 83/246 | 84/216 |
| TAC + Dapon 35 | 96/212 | 102/216 | 86/245 | 92/234 | 76/220 |

As before, the first figure denotes break away torque and the second figure denotes prevailing torque in inch pounds.

Both compositions were then tested to determine water and heat resistance in the manner described in Example V. Both compositions showed an increase in strength at the end of the tests.

EXAMPLE VII

Adhesive compositions containing TAC and Dapon 35 were tested for radiation resistance in comparison to commercially available anaerobic adhesive compositions. Fasteners secured with the various adhesive compositions were exposed to atomic radiation up to a total dosage of 50 MR and were periodically tested. It was found that the prevailing torque did not significantly change over this dosage range. This result is attributed to the much higher aromaticity of the inventive compositions as compared to those of the prior art.

The foregoing description and examples illustrate the invention both in general terms and by way of specific embodiments. Other variations and modifications will be obvious to those skilled in the art.

I claim:

1. A liquid adhesive and sealant composition having extended shelf life when exposed to oxygen but capable of rapidly setting at room temperature upon exclusion from contact with oxygen comprising a mixture of a basic monomer selected from the group consisting of triallylcyanurate, triallylisocyanurate and mixtures thereof, a relatively low molecular weight prepolymer which is soluble in the basic monomer to give a liquid composition at storage and use temperatures and is copolymerizable with the basic monomer, said prepolymer comprising from about 15% to about 50% of the adhesive composition by weight, an ethylenically unsaturated diluent monomer which is soluble in the basic monomer and acts as a solvent for said prepolymer and is copolymerizable with both said basic monomer and said prepolymer, at least one polymerization inhibitor, at least one polymerization promotor and a peroxidetype polymerization initiator.

2. The composition of claim 1 wherein said polymerization initiator is an organic hydroperoxide.

3. The composition of claim 1 wherein said polymerization promoter is selected from the group consisting of amines, amides, imides and sulfimides.

4. The composition of claim 1 wherein said inhibitor is a quinone.

5. The composition of claim 1 including a thixotropic agent comprising colloidal silica.

6. The composition of claim 1 wherein said prepolymer is selected from the group consisting of polyesters and polyvinylmethyl ether.

7. The composition of claim 1, wherein the diluent monomer is selected from the group consisting of the di-, tri- and tetra- esters of acrylic acid or methacrylic acid and a polyhydric alcohol.

8. The composition of claim 1 wherein said inhibitor is a quinone and said polymerization initiator is an organic hydroperoxide.

9. The composition of claim 8 wherein said prepolymer is selected from the group consisting of polyesters and polyvinylmethyl ether and makes up from 15% to 35% by weight of the total composition.

10. The composition of claim 9 wherein said inhibitor is hydroquinone and said promoter is selected from the group consisting of benzoin sulfimide, dimethyl-p-toluidine and mixtures of the two.

11. The composition of claim 1 wherein said prepolymer is selected from the group consisting of polyesters and polyvinylmethyl ether and makes up from 15% to 35% by weight of the total composition.

12. The composition of claim 11 wherein said basic monomer is triallylcyanurate.

13. The composition of claim 1 wherein said prepolymer is a polymerized diallylphthalate.

14. The composition of claim 1 wherein said prepolymer is a polymerized diallylphthalate and makes up from 15% to 35% by weight of the total composition.

* * * * *